US010977909B2

(12) United States Patent
Agrawal et al.

(10) Patent No.: US 10,977,909 B2
(45) Date of Patent: Apr. 13, 2021

(54) SYNCHRONIZING NOTIFICATIONS WITH MEDIA PLAYBACK

(71) Applicant: Motorola Mobility LLC, Chicago, IL (US)

(72) Inventors: Amit Kumar Agrawal, Bangalore (IN); Andre Luiz Silva Bazante, Campinas (BR); Olivier David Meirhaeghe, Lincolnshire, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/508,208

(22) Filed: Jul. 10, 2019

(65) Prior Publication Data

US 2021/0012625 A1    Jan. 14, 2021

(51) Int. Cl.
*G08B 3/10*     (2006.01)
*H04L 12/58*    (2006.01)
*H04M 3/537*    (2006.01)
*H04M 1/725*    (2021.01)
*H04W 4/20*     (2018.01)

(52) U.S. Cl.
CPC .......... *G08B 3/1025* (2013.01); *H04W 4/20* (2013.01)

(58) Field of Classification Search
CPC ........ G08B 3/1025; H04W 4/20; H04W 4/12; H04W 4/14; H04L 51/24; H04L 51/38; H04M 1/72547; H04M 3/537; H04M 1/72552
See application file for complete search history.

(56) References Cited

U.S. PATENT DOCUMENTS

| 7,080,014 | B2  | 7/2006  | Bush et al. |
| 8,005,668 | B2  | 8/2011  | Arun |
| 9,191,918 | B2  | 11/2015 | Dey et al. |
| 9,703,841 | B1  | 7/2017  | Hwang et al. |
| 10,667,878 | B2 | 6/2020  | Cagle et al. |
| 2004/0128137 | A1 | 7/2004 | Bush et al. |
| 2006/0074651 | A1 | 4/2006 | Arun |
| 2013/0288722 | A1* | 10/2013 | Ramanujam ............ H04L 51/26 455/466 |

(Continued)

OTHER PUBLICATIONS

"Android Developers Guides", Retrieved at: https://developer.android.com/guide/topics/ui/notifiers/notifications—on Apr. 23, 2019, 19 pages.

(Continued)

*Primary Examiner* — Christopher M Brandt
(74) *Attorney, Agent, or Firm* — FIG. 1 Patents (57) ABSTRACT

Various embodiments provide an ability to synchronize notifications with media playback. In one or more embodiments, when a user is consuming content, such as music, television, a game, an audible notification can be synchronized with the user's content consumption experience. For example, various embodiments can detect what type of content the user is consuming and changes in the content. For example, when the content is music, various embodiments can detect when the music changes or stops, and can then provide audible notifications to the user. Audible notifications can pertain to notifications associated with incoming messages, calls, and other information such as passive assistance notifications.

20 Claims, 5 Drawing Sheets

(56) References Cited

U.S. PATENT DOCUMENTS

| | | | |
|---|---|---|---|
| 2016/0021247 A1* | 1/2016 | Marimuthu | H04M 3/4286 |
| | | | 455/414.1 |
| 2016/0161946 A1 | 6/2016 | Wuth Sepulveda et al. | |
| 2016/0284349 A1 | 9/2016 | Ravindran et al. | |
| 2017/0346872 A1* | 11/2017 | Naik | G01C 21/3661 |
| 2018/0168755 A1 | 6/2018 | Cagle et al. | |
| 2018/0176885 A1* | 6/2018 | VanBlon | H04L 51/24 |
| 2020/0241824 A1 | 7/2020 | Lee et al. | |
| 2021/0035570 A1 | 2/2021 | Agrawal et al. | |

OTHER PUBLICATIONS

"Context-Based Notifications", Retrieved at: https://www.plotprojects.com/context-based-push-notifications—on Apr. 23, 2019, 8 pages.

Ali,"How to Stop Notifications from Interrupting Music Playback", Retrieved at: https://www.tech-recipes.com/rx/65890/how-to-stop-stop-notifications-from-interrupting-music/, May 13, 2018, 6 pages.

Chainani,"Building Context-Aware Notifications", Retrieved at: https://medium.com/the-lenfest-local-lab/building-context-aware-notifications-c3a7ec9d6bc4, Dec. 4, 2018, 5 pages.

Chuang,"Ambient Notification Environments", Apr. 2017, pp. 38-82.

Elliott,"3 ways to stop iOS notifications from interrupting music playback", Retrieved at: https://www.cnet.com/how-to/3-ways-to-stop-ios-notifications-from-interrupting-music-playback/, Dec. 2, 2016, 9 pages.

Ho,"Using Context-Aware Computing to Reduce the Perceived Burden of Interruptions from Mobile Devices", Apr. 2005, 10 pages.

Katevas,"Continual Prediction of Notification Attendance with Classical and Deep Network Approaches", Dec. 19, 2017, 15 pages.

Kern,"Context-Aware Notification for Wearable Computing", Oct. 2003, 8 pages.

Leonidis,"AlertMe: A Semantics-based Context-Aware Notification System", Jul. 2009, 7 pages.

Leswing,"Android Wear is a contextually-aware phone remote on your wrist", Retrieved at: https://gigaom.com/2014/06/25/android-wear-is-a-contextually-aware-phone-remote-on-your-wrist/, Jun. 25, 2014, 6 pages.

Mehrotra,"Designing Content-driven Intelligent Notification Mechanisms for Mobile Applications", Sep. 2015, 12 pages.

"Non-Final Office Action", U.S. Appl. No. 16/525,401, dated Nov. 19, 2020, 11 pages.

* cited by examiner

SYNCHRONIZING NOTIFICATIONS WITH MEDIA PLAYBACK

BACKGROUND

Many mobile devices allow user interaction through natural language voice commands to implement a hands-free mode of operation. Such is useful, for example, when a user is driving, when they are in a specific location, or when the device is connected with a wireless device. In the hands-free mode, it is useful for the mobile device to audibly announce incoming calls, messages, or other information such as calendar events and the like. Further, some devices provide so-called "proactive assistance" by announcing notifications such as weather changes, breaking news, and the like. This enables the user to receive the notification without having to look at the device or even touch the device.

However, one downside of such hands-free, audible notifications is the potential to disrupt a user's experience. For example, when a user is consuming content, such as music, television, a game, an audible notification can disrupt the user's content consumption experience.

BRIEF DESCRIPTION OF THE DRAWINGS

Embodiments for synchronizing notifications with media playback on a computing device are described with reference to the following Figures. The same numbers may be used throughout to reference like features and components that are shown in the Figures.

DETAILED DESCRIPTION

Overview

Various embodiments provide an ability to synchronize notifications with media playback. In one or more embodiments, when a user is consuming content, such as music, television, a game, and the like, an audible notification can be synchronized with the user's content consumption experience. For example, various embodiments can detect what type of content the user is consuming and changes in the content for purposes of notification synchronization. For example, when the content is music, various embodiments can detect when the music changes or stops, and can then provide audible notifications to the user. Audible notifications can pertain to notifications associated with incoming messages, calls, and other information such as passive assistance notifications.

Alternately or additionally, in at least some embodiments, content can be analyzed for certain cues that suggest the content is about to pause or change. For example, content can be analyzed for transitional events such as statements indicating that the content is about to change. Such can include, by way of example and not limitation, statements such as "we will be right back after a short break", and the like.

Thus, by analyzing content as it is consumed by the user, appropriate times can be determined to audibly present notifications that have been received. So, as notifications are received during the content consumption experience, the notifications are placed in a queue. When the content changes at the appropriate time, such as a change to a commercial or a pause in the content, the notifications can be played back for the user. So, for example, if the user is listening to a song and a notification is in the queue, when the song ends, the notification can be played. Similarly, if the user is playing a video game and pauses the video game, any notifications in the queue can be played.

Alternately or additionally, other embodiments provide an ability to synchronize notifications with media playback occurring on the device itself or with media playback from a separate device. That is, in some embodiments, media playback can occur relative to media content residing on the device on which the notifications are played back, i.e. internal content. Alternately or additionally, media playback can occur relative to media content being played by a separate device, i.e., external content. In these embodiments, notifications can be synchronized to both internal content and external content.

The various embodiments described herein thus provide a computing device with an ability to synchronize notifications of media playback. In doing so, the user's experience is enhanced by virtue of providing an uninterrupted content consumption experience. Notifications are surfaced for the user at an appropriate time and in a manner that ensures that the user has a seamless content consumption experience.

While features and concepts for synchronizing notifications can be implemented in any number of different devices, systems, environments, and/or configurations, embodiments for synchronizing notifications are described in the context of the following example devices, systems, and methods.

Example Operating Environment

Figure 1:
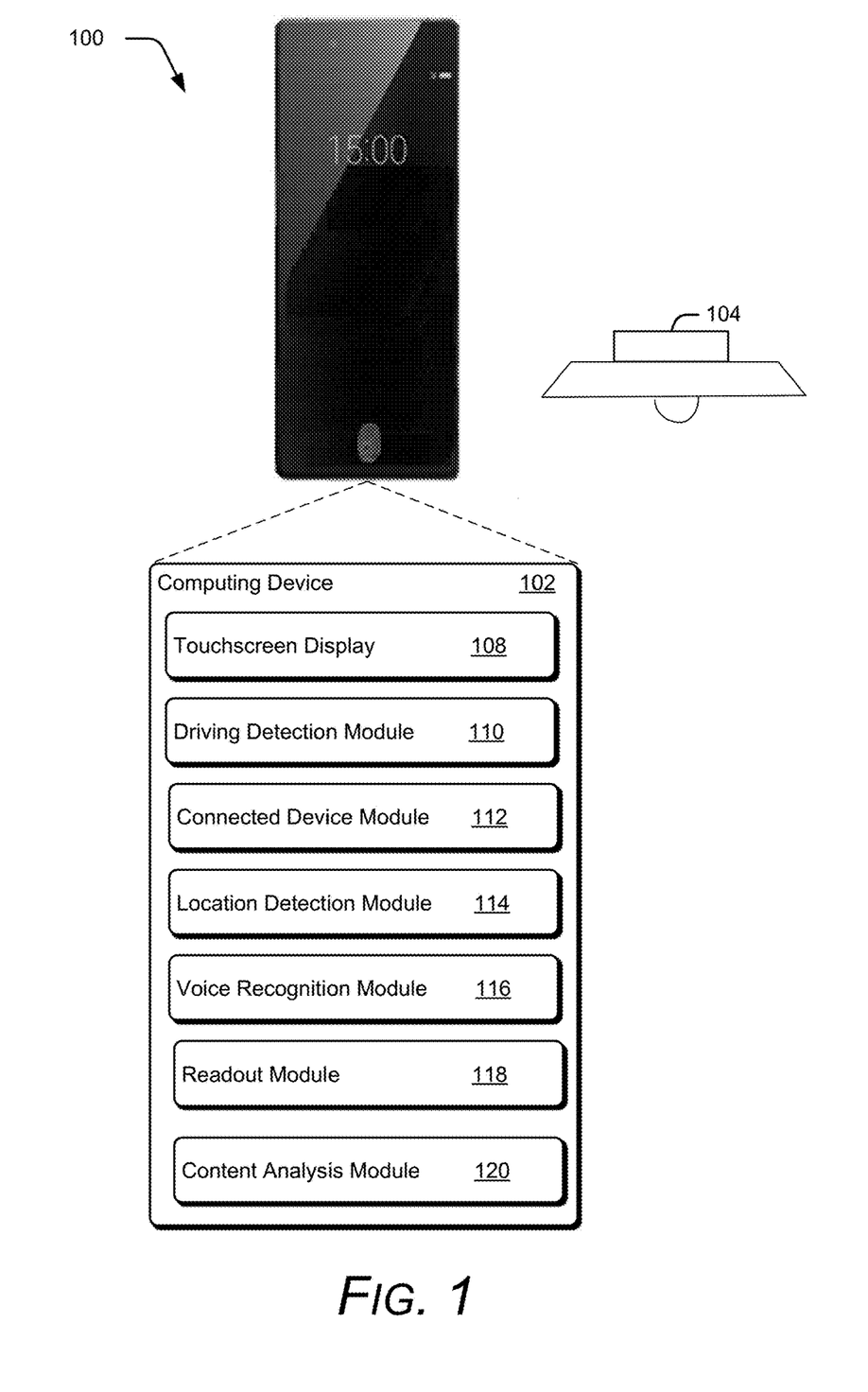
FIG. 1 illustrates an example operating environment in accordance with one or more embodiments.

FIG. 1 illustrates example environment 100 according to one or more embodiments. Environment 100 includes computing device 102, which takes the form of a mobile device in the form of a smart phone. The environment 100 may include an external speaker 104 of some type, such as a speaker associated with an entertainment system, an automotive vehicle, and the like. The speaker 104 can provide various types of content for a user to consume. For example, in at least some embodiments the speaker can provide music content. In other embodiments, the speaker can provide television or gaming content.

Computing device 102 includes touchscreen display 108 as an input/output device. For instance, a user can enter input into computing device 102 by physically interacting with the display at various locations using finger(s) and/or stylus. The user can also receive output from computing device in the form of a visual display. Among other things, touchscreen display 108 captures information about the user's physical interaction, such as a location of the interaction, a size or area used to interact (e.g., a fingerprint size or shape), duration of the interaction, movement of the interaction, and so forth. In some embodiments, touchscreen display 108 wraps around one or more edges of the computing device, e.g., the top edge, the bottom edge, and/or the side edges of computing device to form, in at least some instances, a bezel-less display. Since the touchscreen display wraps around the various sides of computing device 102, a user can enter input by touching these various sides instead of, or in addition to, touching a front surface of touchscreen display 108.

Computing device 102 also includes a driving detection module 110, a connected device module 112, a location detection module 114, a voice recognition module 116, a readout module 118, and a content analysis module 120.

Driving detection module 110 is representative of functionality that determines whether the device 102 is moving in a manner that is consistent with the user driving a vehicle.

Connected device module 112 is representative of functionality that determines whether device 102 is connected to or otherwise paired with a companion device, such as a wireless device.

Location detection module 114 is representative of functionality that determines where the device is located. Any suitable type of technology can be used to determine location such as global positioning technology, triangulation, and the like.

Voice recognition module 116 is representative of functionality that recognizes a user's verbal commands and enables the device to perform operations responsive to receiving verbal commands from the user. Voice recognition module 116 identifies words or commands from audio input. For example, voice recognition module 116 can receive audio input from a microphone connected to, or included in, computing device 102. In turn, voice recognition module 116 extracts or identifies audible words or commands included within the audio input. Any suitable type of speech recognition algorithm and/or model can be used to identify the words or commands, such as Hidden Markov models, dynamic time warping (DTW) based algorithms, neural networks, and so forth. In some embodiments, voice recognition module 116 includes training software to customize speech recognition algorithms to a particular voice. As one example, the training software can prompt a user to audibly state known words or commands, and subsequently train on these known words or command to increase the reliability of their detection based on the user. In some embodiments, voice recognition module 116 can identify a particular word spoken by a particular user, such as a passcode audibly spoken by an authorized user. Accordingly, voice recognition module 116 can identify words or commands, as well as identify a particular user that audibly states the words or commands.

Readout module 118 is representative of functionality that reads out or otherwise provides an audible notification to the user. Notifications can include, by way of example and not limitation, incoming/missed call notifications, incoming message notifications, proactive assistance notifications, and the like.

Content analysis module 120 is representative of functionality that analyzes content to determine the content type and/or the particular instance of content being consumed. The content analysis module 120 can determine both external content type, such as content emanating from speaker 104, or internal content being rendered by the device such as, by way of example and not limitation, music content from a stored playlist. Such can be done using any suitable type of technology. For example, content analysis module 120 can identify external content such as music, movies, advertising, television shows, gaming content and the like based on a short sample played by the device and picked up by a microphone on the device. Such can be done, in some instances, using an audio fingerprint based on a time-frequency graph or spectrogram. Typically, a brief audio sample is obtained and a catalog of audio footprints is utilized to identify the content.

Figure 2:
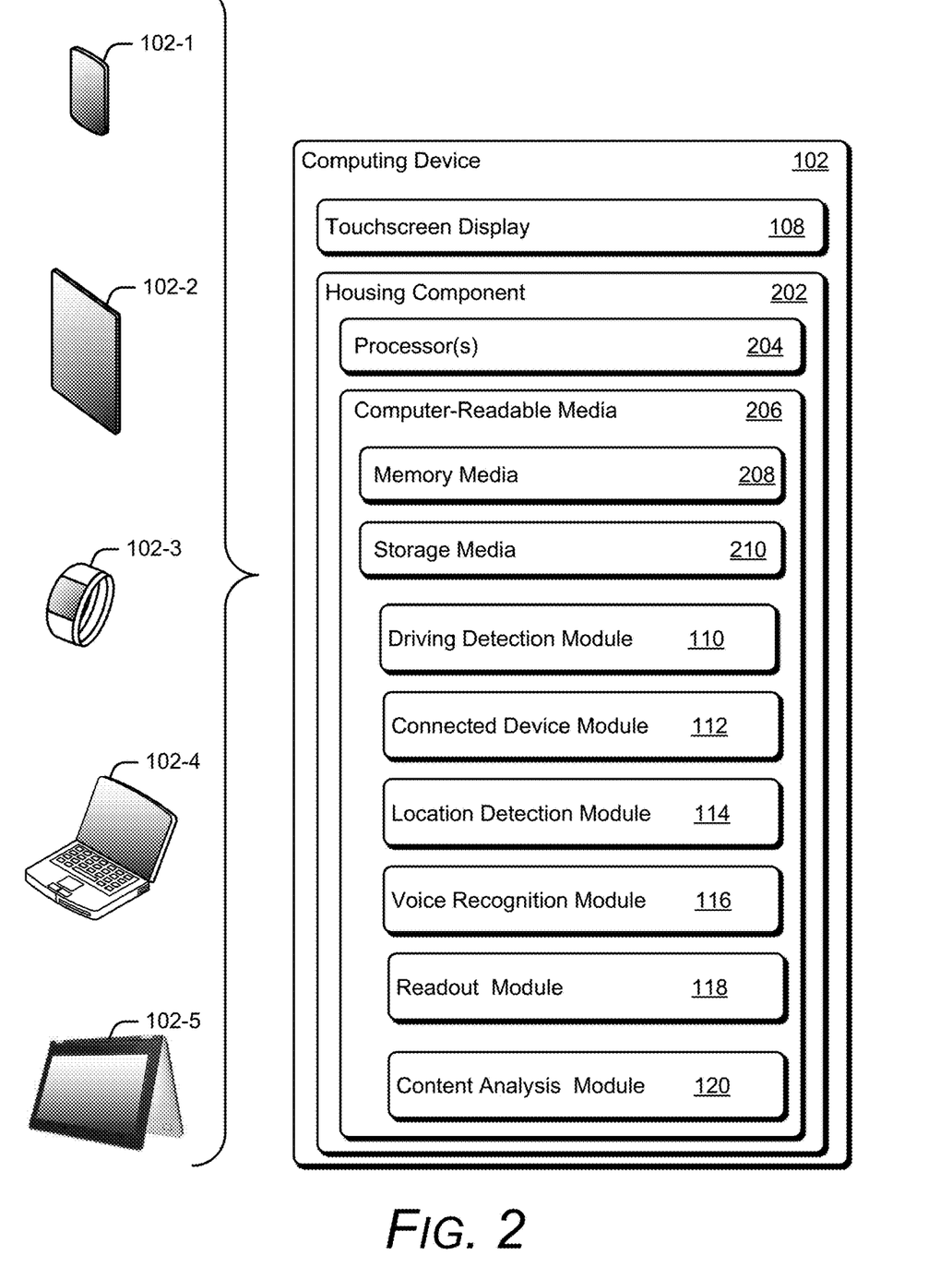
FIG. 2 illustrates an example computing device in accordance with one or more embodiments.

FIG. 2 illustrates an expanded view of computing device 102 of FIG. 1 as being implemented by various non-limiting example devices including: smartphone 102-1, tablet 102-2, smart watch 102-3, laptop 102-4, and convertible laptop 102-5. Accordingly, computing device 102 is representative of any suitable device that incorporates synchronized notifications with media playback in a computing device.

Computing device 102 includes housing component 202 to house or enclose various components within the computing device. Housing component 202 can be a single solid piece, or can be constructed from multiple pieces. The housing component can be constructed from any suitable material, such as metal, silicone, plastic, injection molded material, and so forth. In the cases where housing component 202 is constructed from multiple pieces, each piece can be of a same material, or can incorporate different materials from one another. Among other things, housing component 202 defines the boundaries or shape associated with computing device 102, such as, a top edge, a bottom edge, a right edge and a left edge in the case of a rectangular-shaped computing device, a circumference edge of a circular-shaped computing device, and so forth. To provide touch input for computing device 102, touchscreen display 108 of FIG. 1 is coupled with housing component 202 and/or various components residing within housing component 202.

Computing device 102 also includes processor(s) 204 and computer-readable media 206, which includes memory media 208 and storage media 210. Here processors 204 and computer-readable media 206 reside within housing component 202. In some embodiments, processor(s) 204 include at least one application processor and at least one low power contextual processor. Applications and/or an operating system (not shown) embodied as computer-readable instructions on computer-readable media 206 are executable by processor(s) 204 to provide some, or all, of the functionalities described herein. For example, various embodiments can access an operating system module, which provides high-level access to underlying hardware functionality by obscuring implementation details from a calling program, such as protocol messaging, register configuration, memory access, and so forth.

Computer-readable media 206 includes driving detection module 110, connected device module 112, location detection module 114, voice recognition module 116, readout module 118, and content analysis module 120 of FIG. 1. However, in alternate embodiments, varying combinations of these modules can be included and/or excluded. While these modules are illustrated here as residing on computer-readable media 206, they can alternately or additionally be implemented using hardware, firmware, software, or any combination thereof.

Computing device 102 also includes one or more sensors that provide an ability to sense motion or movement. For instance, the sensors can include an accelerometer, gyroscope, and/or a camera to detect motion near, or tilt associated with, computing device 102. Alternately or additionally, the sensors can include audio sensors to detect input noises and/or voice commands, and/or haptic sensors to deliver tactile interactions with a user.

Having described an example operating environment in which various embodiments can be utilized, consider now a discussion of synchronizing notifications with media playback.

Synchronizing Notifications with Media Playback

Figure 3:
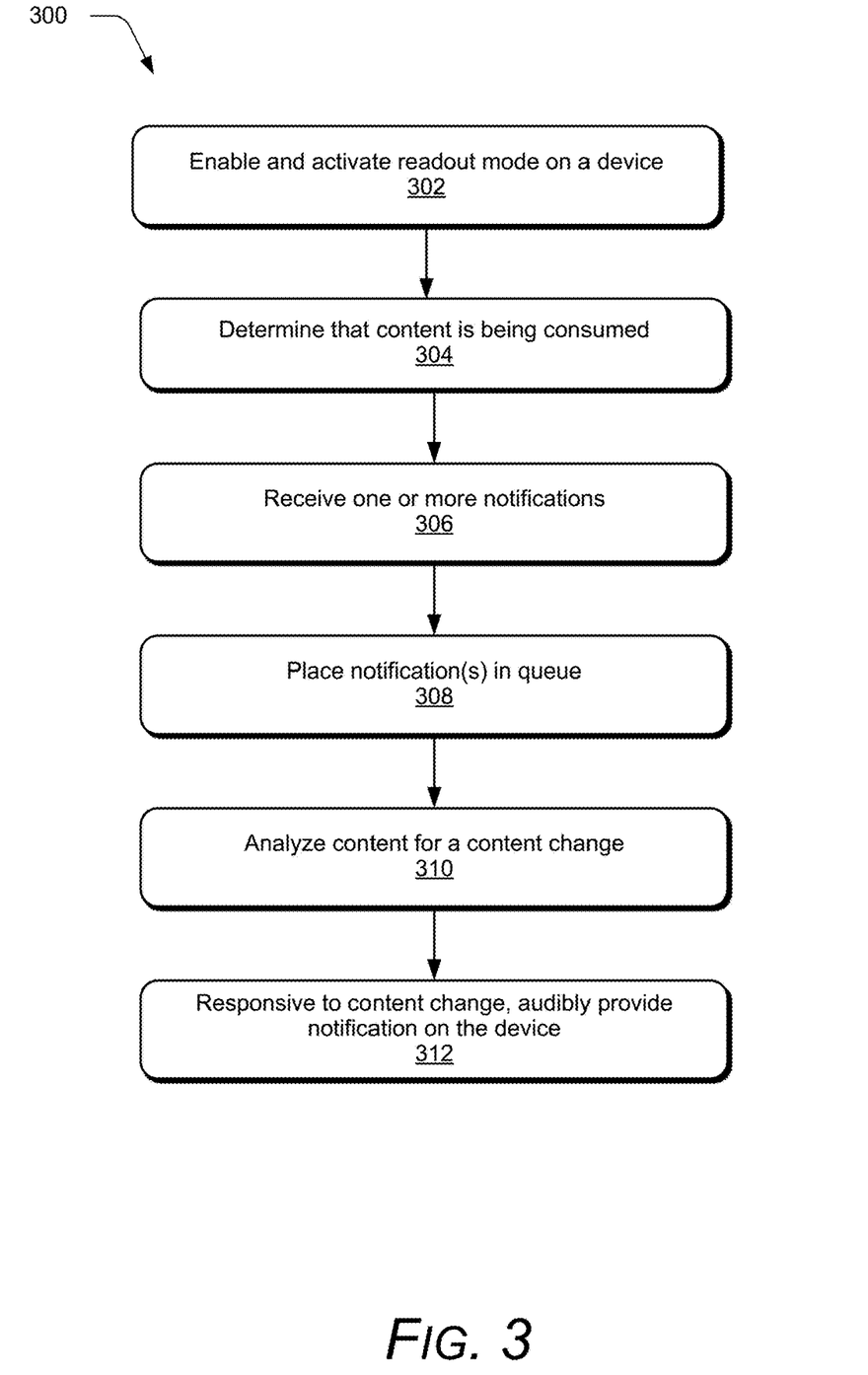
FIG. 3 is a flow diagram that illustrates operations in accordance with one or more embodiments.

FIG. 3 illustrates an example method 300 that employs synchronization of notifications with media playback in accordance with one or more embodiments. Generally, any services, components, modules, methods, and/or operations described herein can be implemented using software, firmware, hardware (e.g., fixed logic circuitry), manual processing, or any combination thereof. For instance, portions or all of method 300 can be performed by varying combinations of driving detection module 110, connected device module 112, location detection module 114, voice recognition module 116, readout module 118, and content analysis module 120 of FIGS. 1 and 2. Some operations of the example methods may be described in the general context of executable instructions stored on computer-readable storage memory that is local and/or remote to a computer processing system, and implementations can include software applications, programs, functions, and the like. Alternately or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. While method 300 illustrates steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At block 302, the readout mode on a device is enabled and activated. By "enabled" is meant that the feature itself is turned on, as by a suitable user interface element. By "activated" is meant that the user is in a particular state such as driving, at home, has enabled the feature for a particular location, and the like. This operation can be performed in any suitable way. For example, this operation can be performed automatically or manually. For examples of automatic activation, the readout mode can be activated by the driving detection module 110 when the module detects that the device is being moved in a manner consistent with the user driving. Alternately or additionally, the readout mode can be activated by the connected device module 112 when a determination is made that the device has connected with an external device, e.g., wirelessly. Alternately or additionally, the readout mode can be activated by the location detection module 114 based upon a particular detected location. That is, the user may have defined particular locations at which the readout mode is to be activated. Alternately or additionally, there may be locations which, by their very nature, make it desirable to have the readout mode activated.

At block 304, computing device determines that content is being consumed. As noted above, any suitable type of content can be consumed examples of which include content that is external to the computing device (such as content emanating from a secondary device) and/or content that is internal to the computing device. In addition, various different content types can be consumed including, by way of example and not limitation, music such as that from an internal playlist or external speaker, television content, radio content, Internet streaming, gaming content, and the like.

At block 306, one or more notifications are received by the device. Any suitable type of notifications can be received including, by way of example and not limitation, incoming call notifications, incoming message notifications, passive assistance notifications, and the like. At block 308, the device places the notification or notifications into a queue.

At block 310, the content being consumed is analyzed for a content change. This operation can be performed in any suitable way. For example, this operation can be performed by determining not only the content type, i.e. music, but also the specific instance of the content type, i.e., the song title. In this example, by determining the specific song being played, the device will know when the song is over based, for example, on the song's frequency-time signature. Alternately or additionally, content can be analyzed for a content change by listening for transition events such as periods of silence, transitional phrases, a song's frequency time signature changing into a different frequency-time signature such as one associated with a commercial.

At block 312, responsive to a content change, an audible notification is provided on the device. The audible notification can comprise any suitable audible notification. For example, the audible notification can read out the content of a telephone call or message. Alternately or additionally, the audible notification can simply audibly notify the user that a telephone call has been missed or that a message has been received. In this manner, the user's content consumption experience is not degraded by having their content consumption interrupted with the notification before the content has concluded.

Figure 4:
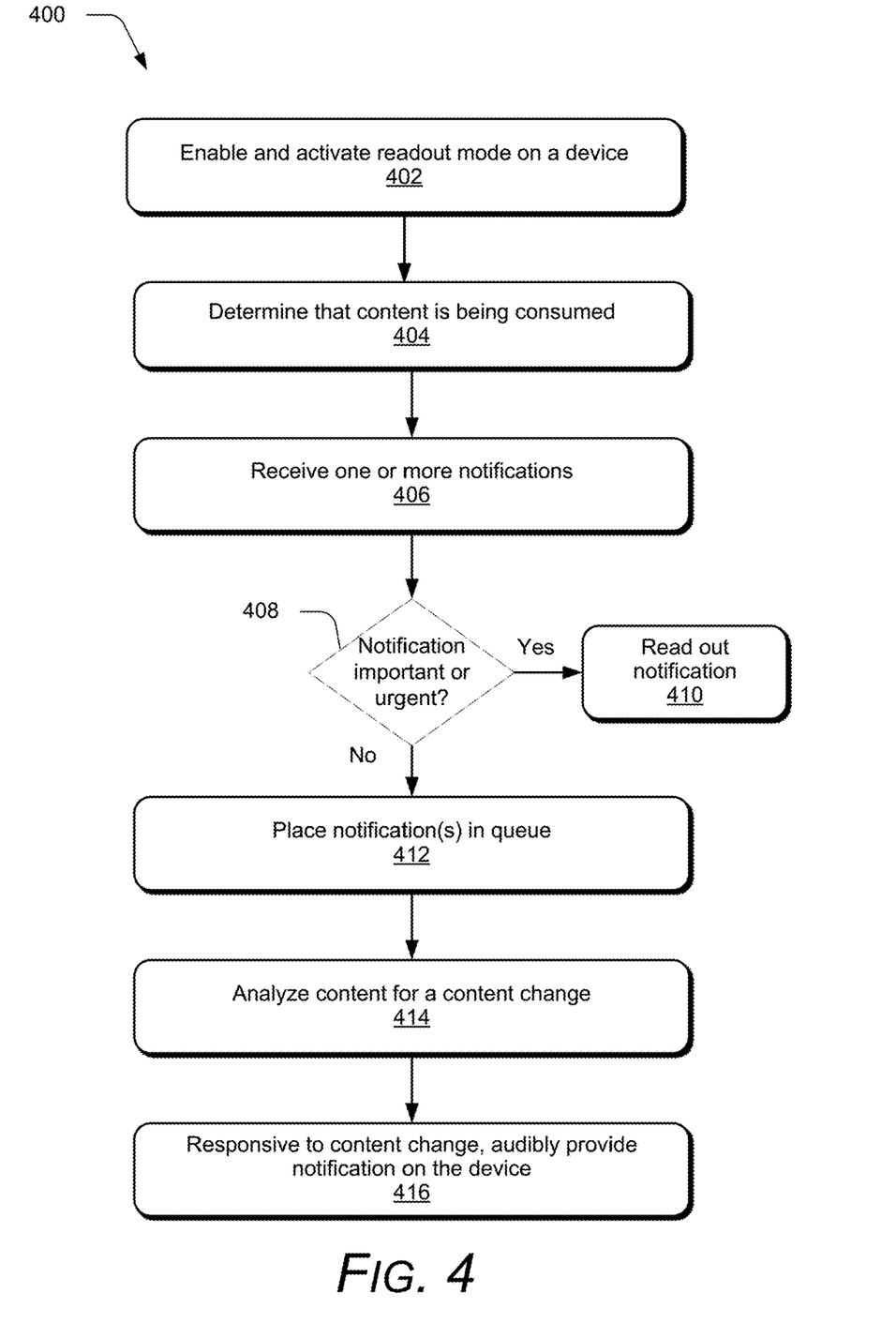
FIG. 4 is a flow diagram that illustrates operations in accordance with one or more embodiments.

FIG. 4 illustrates an example method 400 that employs synchronization of notifications with media playback in accordance with one or more embodiments. Generally, any services, components, modules, methods, and/or operations described herein can be implemented using software, firmware, hardware (e.g., fixed logic circuitry), manual processing, or any combination thereof. For instance, portions or all of method 400 can be performed by varying combinations of driving detection module 110, connected device module 112, location detection module 114, voice recognition module 116, readout module 118, and content analysis module 120 of FIG. 1. Some operations of the example methods may be described in the general context of executable instructions stored on computer-readable storage memory that is local and/or remote to a computer processing system, and implementations can include software applications, programs, functions, and the like. Alternately or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. While method 400 illustrates steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At block 402, the readout mode on a device is enabled and activated. By "enabled" is meant that the feature itself is turned on. By "activated" is meant that the user is in a particular state such as driving, at home, has enabled the feature for a particular location, and the like. This operation can be performed in any suitable way. For example, this operation can be performed automatically or manually. For examples of automatic activation, the readout mode can be activated by the driving detection module 110 when the module detects that the device is being moved in a manner consistent with the user driving. Alternately or additionally, the readout mode can be activated by the connected device module 112 when a determination is made that the device has connected with an external device, e.g., wirelessly. Alternately or additionally, the readout mode can be activated by the location detection module 114 based upon a particular detected location. That is, the user may have defined particular locations at which the readout mode is to be activated. Alternately or additionally, there may be locations which, by their very nature, make it desirable to have the readout mode activated.

At block 404, computing device determines that content is being consumed. As noted above, any suitable type of content can be consumed examples of which include content that is external to the computing device (such as content emanating from a secondary device) and/or content that is internal to the computing device. In addition, various different content types can be consumed including, by way of example and not limitation, music such as that from an internal playlist or external speaker, television content, radio content, Internet streaming, gaming content, and the like.

At block 406, one or more notifications are received by the device. Any suitable type of notifications can be received including, by way of example and not limitation, incoming call notifications, incoming message notifications, passive assistance notifications, and the like. At block 408, a determination is made as to whether the notification is important or urgent. This operation can be performed in any suitable way. For example, a user may have identified certain individuals whose notifications should always be considered as important or urgent. Alternately or additionally, a notification or associated message may be analyzed and compared to a list of keywords to assess the importance or urgency of a message. For example, words such as "important", "critical", "necessary", and the like may be indicative of an important or urgent notification. If so, at block 410 the notification is immediately read-out, regardless of the media playback state.

If, on the other hand, the notification is not deemed to be important or urgent, at block 412, the device places the notification or notifications into a queue.

At block 414, the content being consumed is analyzed for a content change. This operation can be performed in any suitable way. For example, this operation can be performed by determining not only the content type, i.e. music, but also the specific instance of the content type, i.e., the song title. In this example, by determining the specific song being played, the device will know when the song is over based, for example, on the song's frequency-time signature. Alternately or additionally, content can be analyzed for a content change by listening for transition events such as periods of silence, transitional phrases, a song's frequency time signature changing into a different frequency-time signature such as one associated with a commercial.

At block 416, responsive to a content change, an audible notification is provided on the device. In this manner, the user's content consumption experience is not degraded by having their content consumption interrupted with the notification before the content has concluded.

Having considered a discussion of synchronizing notifications with media playback in accordance with one or more embodiments, consider now an example computing device that can implement the embodiments described above.

Example Device

Figure 5:
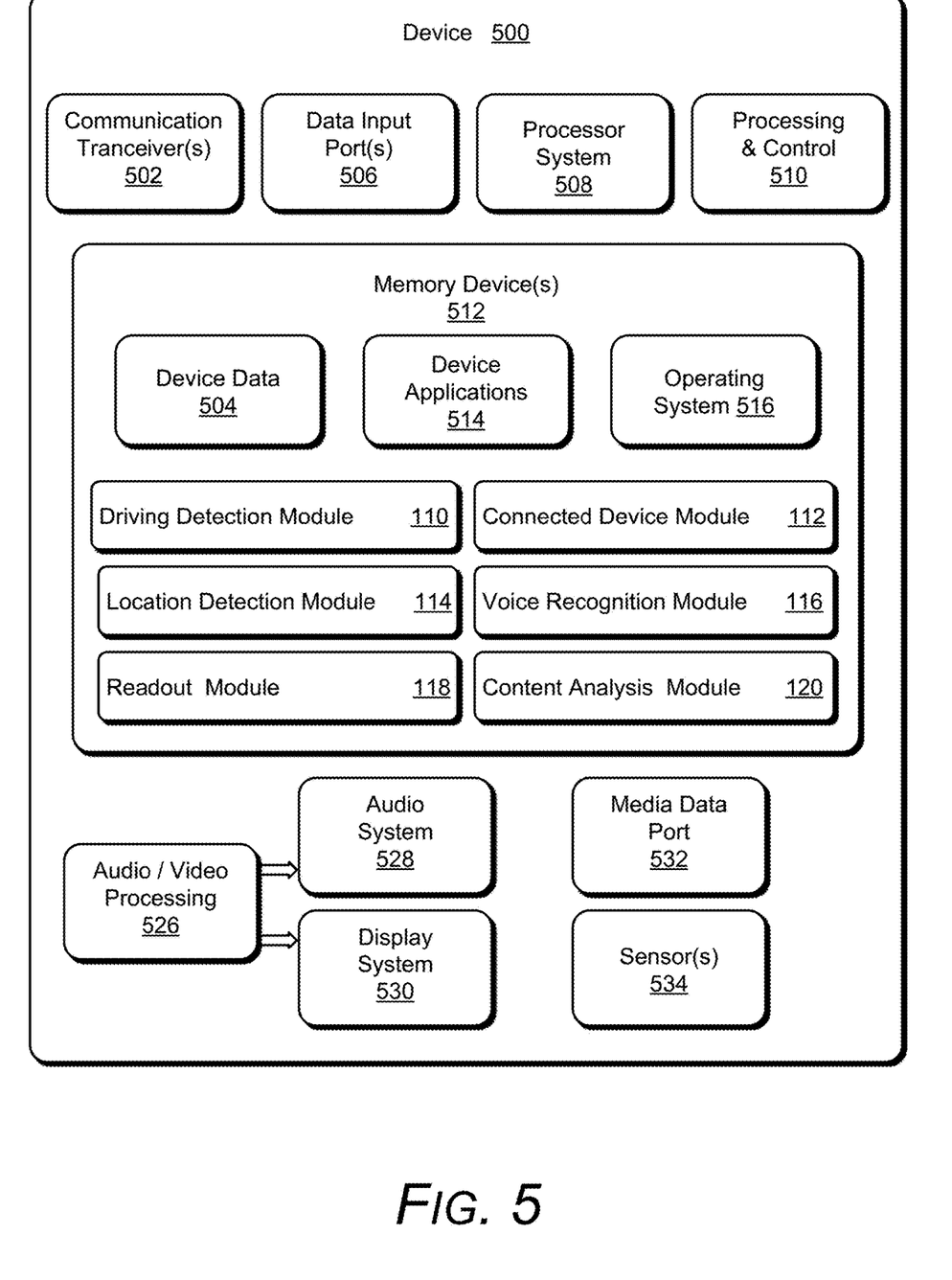
FIG. 5 illustrates various components of an example device that can implement various embodiments.

FIG. 5 illustrates various components of an example device 500 in which synchronizing notifications with media playback on a computing device can be implemented. The example device 500 can be implemented as any suitable type of computing device, such as any type of mobile phone, tablet, computing, communication, entertainment, gaming, media playback, and/or other type of device. For example, computing device 102 shown in FIG. 1 may be implemented as the example device 500.

The device 500 includes communication transceivers 502 that enable wired and/or wireless communication of device data 504 with other devices. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 500 may also include one or more data input ports 506 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones, cameras, and/or modular attachments.

The device 500 includes a processing system 508 of one or more processors (e.g., any of microprocessors, controllers, and the like) and/or a processor and memory system implemented as a system-on-chip (SoC) that processes computer-executable instructions. In some embodiments, processor system 508 includes a low power contextual processor and an application processor. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device can be implemented with any one or combination of software, hardware, firmware, or fixed logic circuitry that is implemented in connection with processing and control circuits, which are generally identified at 510. The device 500 may further include any type of a system bus or other data and command transfer system that couples the various components within the device. A system bus can include any one or combination of different bus structures and architectures, as well as control and data lines.

The device 500 also includes computer-readable storage memory or memory devices 512 that enable data storage, such as data storage devices that can be accessed by a computing device, and that provide persistent storage of data and executable instructions (e.g., software applications, programs, functions, and the like). Examples of the computer-readable storage memory or memory devices 512 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 500 may also include a mass storage media device.

The computer-readable storage memory provides data storage mechanisms to store the device data 504, other types of information and/or data, and various device applications 514 (e.g., software applications). For example, an operating system 516 can be maintained as software instructions with a memory device and executed by the processing system 508. The device applications may also include a device manager, such as any form of a control application, software application, signal-processing and control module, code that is native to a particular device, a hardware abstraction layer for a particular device, and so on. In this example, the device 500 includes a driving detection module 110, connected device module 112, location detection module 114, voice recognition module 116, readout module 118, and content analysis module 120 as described above.

The device 500 also includes an audio and/or video processing system 526 that generates audio data for an audio system 528 and/or generates display data for a display system 530.

In some embodiments, display system 530 includes a touchscreen display that wraps or extends around the edges of a housing component of device 500 such that device 500 includes touch input capacitance around its edges. Alternately or additionally, display system 530 works in concert with touch input analysis module 528 and/or control placement module 534 to facilitate synchronizing notifications of media playback.

The audio system 528 and/or the display system 530 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 532. In implementations, the audio system and/or the display system are integrated components of the example device. Alternatively, the audio system and/or the display system are external, peripheral components to the example device.

Device 500 also includes sensor(s) 534 that can be used to detect motion of, or around, device 500. Sensors(s) 534 can also include audio sensors to detect or receive audio input to device 500. In some embodiments, sensor(s) 534 provide input to other modules to facilitate their functionality. Alternately or additionally, sensors 534 can include haptic sensors that are configured to provide haptic feedback.

CONCLUSION

Various embodiments provide an ability to synchronize notifications with media playback. In one or more embodiments, when a user is consuming content, such as music, television, a game, an audible notification can be synchronized with the user's content consumption experience. For example, various embodiments can detect what type of content the user is consuming and changes in the content. For example, when the content is music, various embodiments can detect when the music changes or stops, and can then provide audible notifications to the user. Audible notifications can pertain to notifications associated with incoming messages, calls, and other information such as passive assistance notifications.

Although various embodiments have been described in language specific to features and/or methods, the subject of the appended claims is not necessarily limited to the specific features or methods described. Rather, the specific features and methods are disclosed as example implementations, and other equivalent features and methods are intended to be within the scope of the appended claims. Further, various different embodiments are described and it is to be appreciated that each described embodiment can be implemented independently or in connection with one or more other described embodiments.

We claim:

1. A computing device comprising:
one or more processors; and
one or more computer-readable storage devices storing processing-executable instructions which, responsive to execution by the one or more processors, cause the computing device to perform operations comprising:
activating a read-out mode on a computing device;
determining that content is being consumed;
receiving, on the computing device, one or more notifications;
placing the one or more notifications into a queue;
analyzing the content being consumed to identify a transitional phrase in the content that indicates a content change; and
responsive to the content change, providing an audible notification associated with the one or more notifications in the queue.

2. The computing device as recited in claim 1, wherein said content is external to the computing device.

3. The computing device as recited in claim 1, wherein said content comprises music.

4. The computing device as recited in claim 3, wherein said music comprises a playlist internal to the computing device.

5. The computing device as recited in claim 3, wherein said music is from a speaker external to the computing device.

6. The computing device as recited in claim 1, wherein said content comprises at least one of television content, Internet streaming content, or gaming content.

7. The computing device as recited in claim 1, wherein said one or more notifications comprise a notification that a telephone call has been missed.

8. The computing device as recited in claim 1 further comprising:
receiving an additional notification during content consumption;
determining that the additional notification is important; and
immediately reading out the additional notification.

9. A computer-implemented method comprising:
activating a read-out mode on a computing device;
determining that content is being consumed;
receiving, on the computing device, one or more notifications;
placing the one or more notifications into a queue;
analyzing the content being consumed to identify a transitional phrase in the content that indicates a content change; and
responsive to the content change, providing an audible notification associated with the one or more notifications in the queue.

10. The computer-implemented method of claim 9, wherein said content is internal to the computing device.

11. The computer-implemented method of claim 9, wherein said content comprises music.

12. The computer-implemented method of claim 11, wherein said music comprises a playlist internal to the computing device.

13. The computer-implemented method of claim 11, wherein said music is from a speaker external to the computing device.

14. The computer-implemented method of claim 9, wherein said content comprises at least one of television content, Internet streaming content, or gaming content.

15. The computer-implemented method of claim 9, wherein said one or more notifications comprise a notification that a telephone call has been missed.

16. The computer-implemented method of claim 9 further comprising:

receiving an additional notification during content consumption;

determining that the additional notification is important; and immediately reading out the additional notification.

17. One or more non-transitory computer-readable storage media storing instructions which, when executed, perform operations comprising:

activating a read-out mode on a computing device;

determining that content is being consumed;

receiving, on the computing device, one or more notifications;

placing the one or more notifications into a queue;

analyzing the content being consumed to identify a transitional phrase in the content that indicates a content change; and responsive to a content change, providing an audible notification associated with the one or more notifications in the queue.

18. The one or more non-transitory computer-readable storage media of claim 17, wherein said content comprises music external to the computing device.

19. The one or more non-transitory computer-readable storage media of claim 17, wherein said content comprises at least one of television content, Internet streaming content, or gaming content.

20. The one or more non-transitory computer-readable storage media of claim 17, wherein said one or more notifications comprise a notification that a telephone call has been missed.

* * * * *